United States Patent [19]
Fiedler et al.

[11] Patent Number: 5,265,095
[45] Date of Patent: Nov. 23, 1993

[54] METHOD FOR INPUTTING SIGNALS INTO AND OUTPUTTING SIGNALS OUT FROM SUBAREAS OF THE AUXILIARY SIGNALS OF TRANSPORT MODULES OF A SYNCHRONOUS DIGITAL SIGNAL HIERARCHY

[75] Inventors: Udo Fiedler, Leinburg; Walter Lechler; Gerhard Musil, both of Munich; Wilhelm Volejnik, Sauerlach; Guenter Weimert, Munich, all of Fed. Rep. of Germany

[73] Assignee: Siemens Aktiengesellschaft, Munich, Fed. Rep. of Germany

[21] Appl. No.: 602,301
[22] PCT Filed: Jun. 2, 1989
[86] PCT No.: PCT/DE89/00366
§ 371 Date: Dec. 5, 1990
§ 102(e) Date: Dec. 5, 1990
[87] PCT Pub. No.: WO89/12365
PCT Pub. Date: Dec. 14, 1989

[30] Foreign Application Priority Data
Jun. 6, 1988 [DE] Fed. Rep. of Germany ....... 3819259

[51] Int. Cl.⁵ .............................. H04J 3/04
[52] U.S. Cl. .................... 370/94.1; 370/112
[58] Field of Search ............... 370/84, 60, 60.1, 94.1, 370/94.2, 110.112, 66, 67

[56] References Cited
U.S. PATENT DOCUMENTS
4,719,624  1/1988  Bellisio ............... 370/110.1
5,060,229  10/1991  Tyrrell et al. ........ 370/110.1

Primary Examiner—Wellington Chin
Attorney, Agent, or Firm—Hill, Steadman & Simpson

[57] ABSTRACT

Method for inputting signals into and outputting signals out of subareas of the auxiliary signals of transport modules of a synchronous digital signal hierarchy.

The invention is based on the object of specifying a method for outputting signals from at least one subarea of the auxiliary signals and for inputting signals into at least one subarea of the auxiliary signals of transport modules of a synchronous digital signal hierarchy according to the CCITT Draft Recommendations G.70X, G.70Y and G.70Z.

This object is achieved during outputting in that a subarea of the auxiliary signals is output from the transport module (STM-4) in a demultiplexing and spreader means (1a) and is spread over a time span within the frame. The spread signal, for example, is resolved into the auxiliary signals (TB-STM-4) of the selected subarea that are allocated to the transport modules of the lowest hierarchy level contained in the transport module (STM-4). For inputting, these method steps are implemented in the reverse sequence and in the opposite sense. These auxiliary signals (DB-STM-1) are forwarded onto the lines (L1-L4) of the bus (B). Control signals (T) that are generated in the demultiplexing and spreader means (1A) or that are externally supplied are transmitted on a sub-bus (SL). After inputting addresses (A) bytes (D) or byte groups (D) can be taken from the bus (B) via customer interfaces (2a, 3a) and can be further-processed.

This method can be employed in synchronous digital signal hierarchies such as NNI (network node interface).

30 Claims, 5 Drawing Sheets

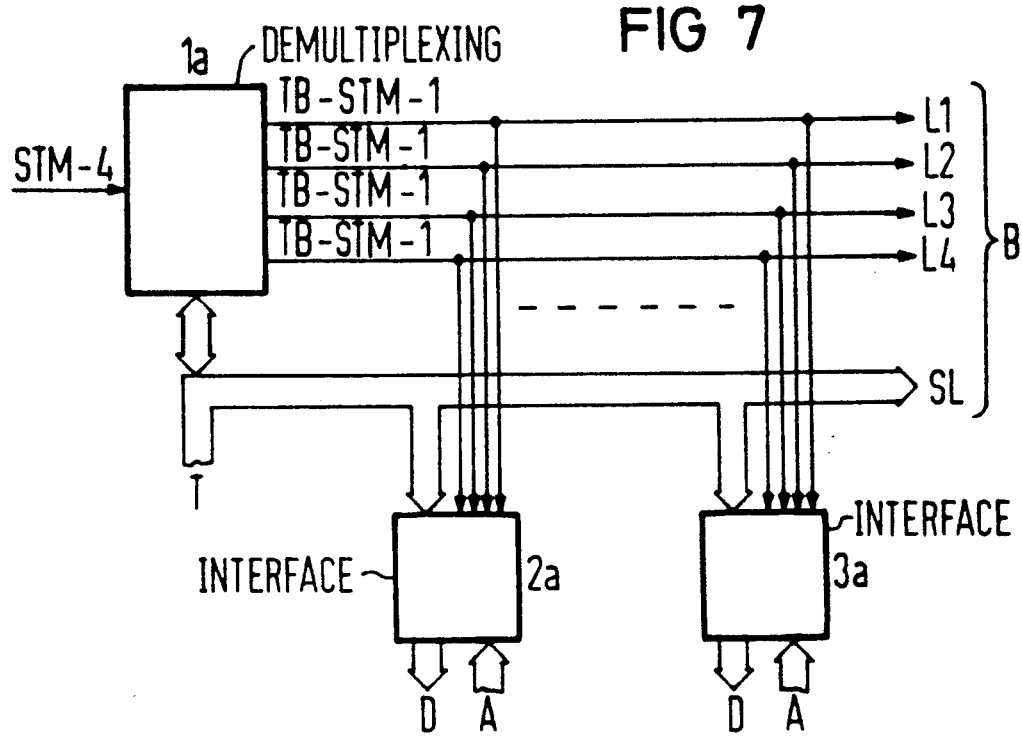
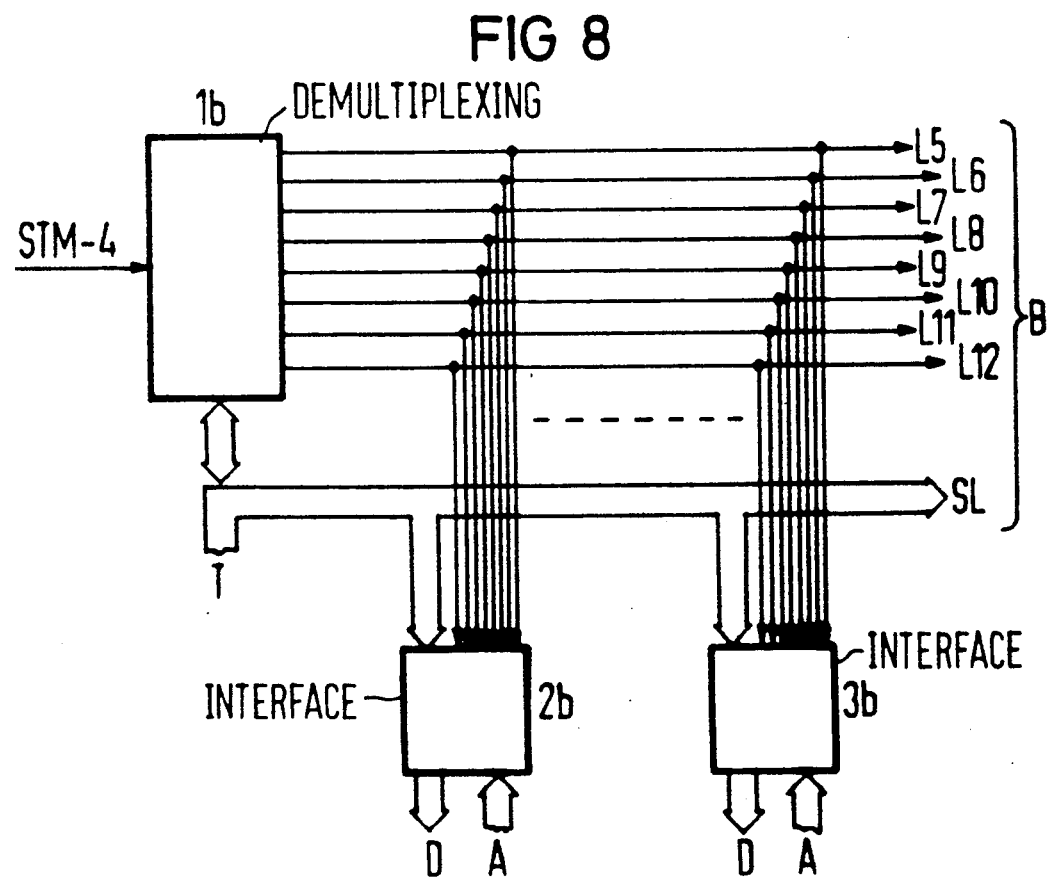

METHOD FOR INPUTTING SIGNALS INTO AND OUTPUTTING SIGNALS OUT FROM SUBAREAS OF THE AUXILIARY SIGNALS OF TRANSPORT MODULES OF A SYNCHRONOUS DIGITAL SIGNAL HIERARCHY

BACKGROUND OF THE INVENTION

The invention is directed to a method for outputting signals from at least one subarea of auxiliary signals and for inputting new or modified signals into at least one free of freed up subarea of transport modules of a synchronous digital signal hierarchy according to the CCITT Draft Recommendations G.70X, G.70Y and G.70Z, in accord wherewith the frame of the transport modules is composed of 9 rows and N-times 270 columns (N is a whole number) for respectively one byte per row and column and contains an administration unit for the acceptance of virtual containers whose frame start is marked by pointers.

Standardized bit rates between 64 kbit/s and 139 264 kbit/s are listed in the "CCITT Red Book", Vol. III-Fascicle III.3, Digital Networks-Transmission Systems and Multiplexing Equipment, Geneva, 1985, page 41.

The periodical "Telecommunications", March 1988, pages 63, 65 and 66 describes synchronous digital signal hierarchies for international use that are known under the designations SONET (synchronous optical network) and NNI (network node interface).

The afore-mentioned CCITT Draft Recommendations contain NNI definitions. Digital signals having a bit rate of 155 520 kbit/s are transmitted in the lowest hierarchy level. Their pulse frame is referred to as a synchronous transport module STM-1. The next hierarchy level is intended for the four-fold bit rate 622 080 kbit/s and synchronous transport modules STM-4. Synchronous transport modules STM-8, STM-12 and STM-16 are possible. In addition to the useful signals, auxiliary signals such as section overhead, path overhead, pointer and fixed stuff bits are contained in these transport modules.

The publication "GLOBECOM'85 IEEE, Global Telecommunications Conference, Conference Record Volume 3 of 3, New Orleans, La., 2 through 5 December 1985, pages 1443 through 1450, particularly FIG. 11, discloses an add drop multiplexer. This serves the purpose of multiplexing STS signals and also serves the purpose of outputting STS-1 signals from incoming STS-N signals of a higher hierarchy level. STS signals are composed of pulse frame having a header for auxiliary signals and of a main part for signals to be transported that can in turn themselves contain auxiliary signals in the form of a path overhead. An inputting and outputting of auxiliary signals or subareas thereof is not provided.

U.S. Pat. No. 4,574,375, finally, discloses a an interface arrangement for a telephone system or the like. In this, complete digital signals incoming on a bus line have their channel nested in a pulse frame taken for a processing such as setting signal level, dual tone multi-frequency signaling or network echo elimination and are subsequently returned onto a bus line. Here, too, neither auxiliary signals nor subareas thereof are separately input or output.

SUMMARY OF THE INVENTION

It is an object of the invention to output signals from subareas of these auxiliary signals of a transport module and to make them available capable of being further-processed in an optimally flexible way, as well as, conversely, to input signals into such subareas.

This object is inventively achieved by a method in which: the subareas are spread; the spread subareas are combined serially or in parallel to a bus together with additional control signals; bytes or byte groups are parted from the bus as signals and are output; and, for inputting, these method steps are implemented in the reverse sequence and in the opposite sense.

For transport modules of a higher order, before the outputting, a transport module of the higher order is resolved into transport modules of a lower order, and, when inputting, transport modules of a lower order are combined to form a transport module of the higher order in the corresponding method step.

Alternatively, for transport modules of a higher order, when outputting from subareas that are formed of subareas of a plurality of transport modules, these are separated after the spreading, and, when inputting, a plurality of subareas are combined before the combining in the corresponding method step.

The following are further features of the present invention.

Bytes from virtual containers are identified for the parting via the positions of the respective pointers and such bytes are correspondingly introduced during inputting. Every subarea can be composed of at least one complete column. The bit rate of the spread signal can be selected such that it is a single or a whole-numbered multiple of a bit rate standardized by CCITT. The size of the subareas can be selected such that a bit rate that is a single or a whole-numbered multiple of a bit rate standardized by CCITT derives from the sum thereof after the spreading.

One or more section overheads can be selected as a subarea, one or more path overheads can be selected as a subarea, or one or more pointers can be selected as a subarea. Areas documented for fixed stuffing can be selected as subarea.

The bytes from a respective transport module of the lower order can be serially transmitted in the bus on their own line. The output bytes can be transmitted bit-parallel in the bus on eight lines Bytes or byte groups parted from the bus can be sorted and combined to form at least one new time-division multiplex signal. The byte selection from the bus can be locally undertaken via switches, or remotely controlled via control buses. Only freely available bytes are combined in the bus and an identifier of the freely available bytes is transmitted. Additional control signals can be frame, bit, byte, byte group, section overhead row and spread bit clocks or externally generated control signals can be selected instead of the additional control signals.

BRIEF DESCRIPTION OF THE DRAWINGS

The invention shall be set forth in greater detail below with reference to exemplary embodiments.

FIG. 7 shows a first bus arrangement;

FIG. 8 shows a second bus arrangement; and

DESCRIPTION OF THE PREFERRED EMBODIMENT

Figure 1:
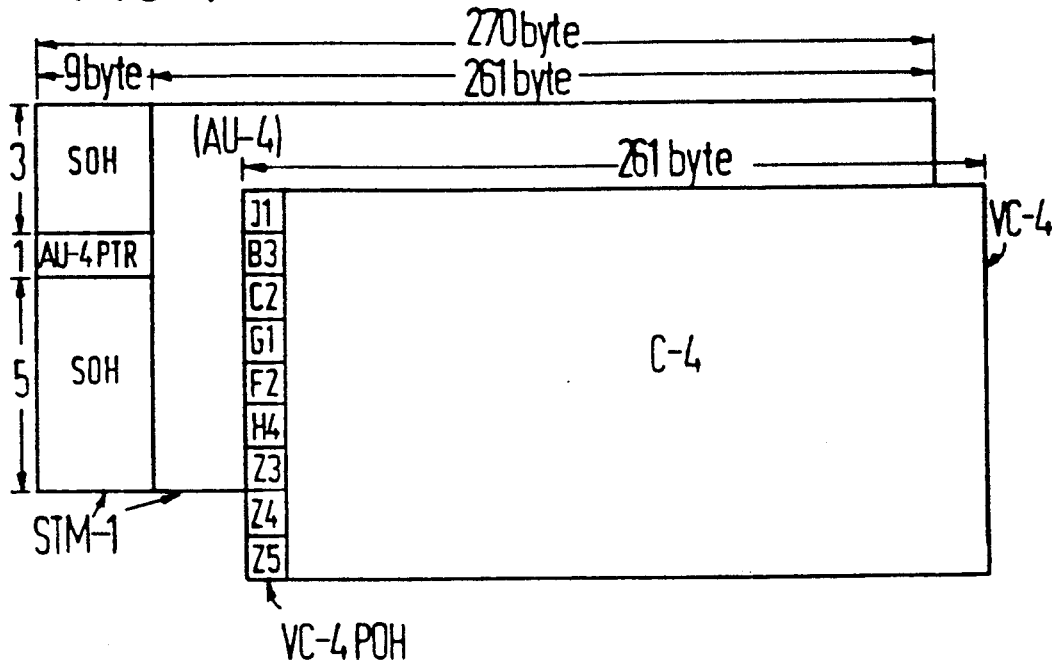
FIG. 1 shows a transport module STM-1 having a virtual container VC-4.

FIG. 1 shows a known synchronous transport module STM-1. This is subdivided into the section overhead SOH, into an administration unit AU-4 and into an administration unit pointer AU-4 PTR. A virtual container VC-4 can be inserted into the administration unit AU-4, whereby the administration unit pointer AU-4 PTR indicates where the virtual container VC-4 begins in the administration unit AU-4. The virtual container VC-4 is in turn composed of a path overhead VC-4 POH and of a container C-4. The latter serves for the acceptance of a 139 264 kbit/s signal. Bytes having defined auxiliary signals that accompany the content of the container C-4 up to the multiplexing are situated in the path overhead VC-4 POH.

The transport module STM-1 is composed of 9 rows and 270 columns or, respectively, bytes. The section overhead SOH and the administration unit pointer AU-4 PTR occupy 9 columns or, respectively, bytes. 261 columns or, respectively, bytes remain for the administration unit AU-4 or, respectively, for the virtual container VC-4. One byte contains 8 bits.

Figure 2:
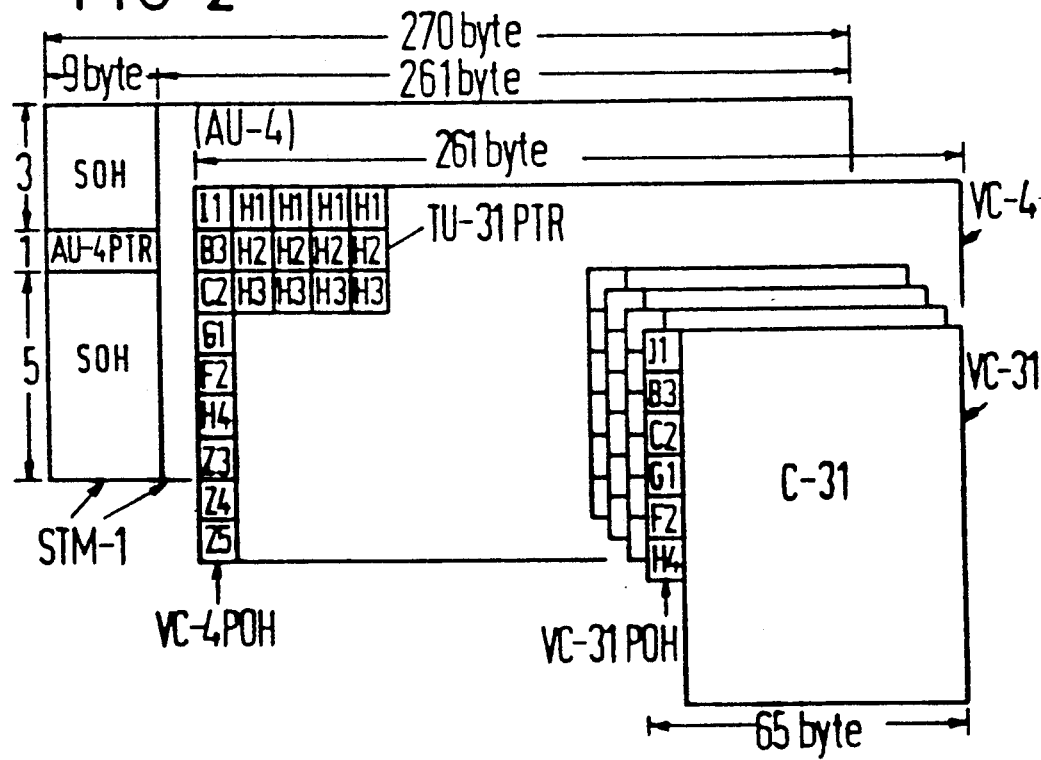
FIG. 2 shows a transport module STM-1 having a virtual container VC-4 and having four virtual containers VC-31.

FIG. 2 shows how four virtual containers VC-31 can be inserted into the virtual container VC-4 in a known way. The virtual containers VC-31 are composed of a path overhead VC-31 POH that is 1-byte wide and extends over the first six rows and of a container C-31 that is 64 bytes wide. After the insertion of the four virtual containers VC-31 into the virtual container VC-4, space for four transport unit pointers TU-31 PTR remains therein. A container C-31 can accept a 34 368 kbit/s signal.

Figure 3:
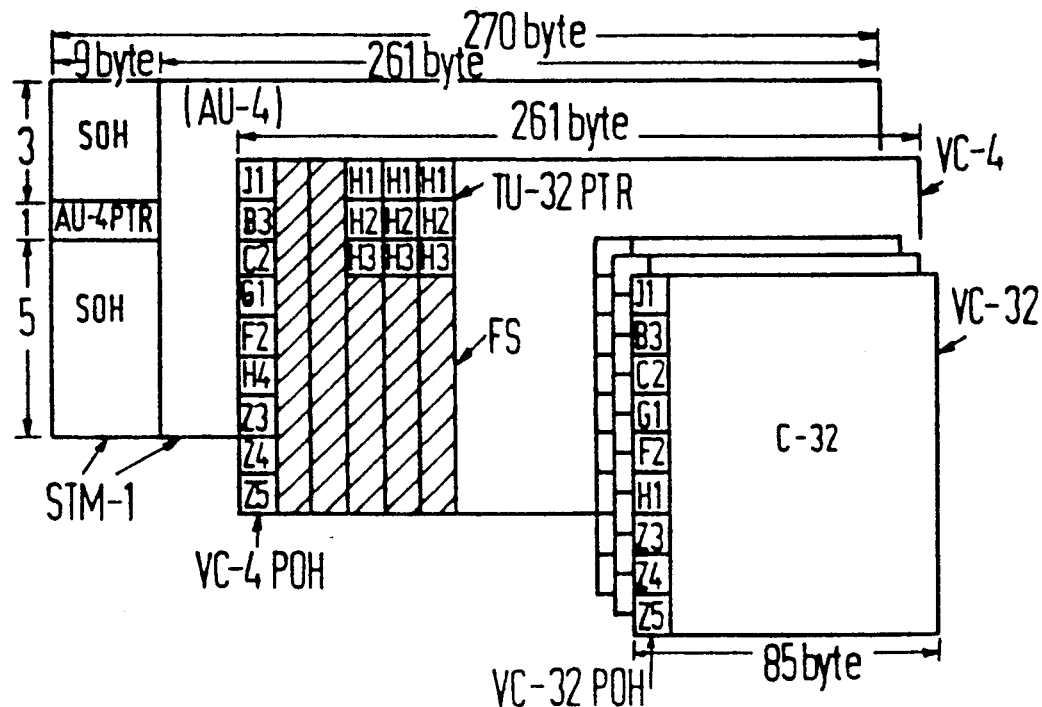
FIG. 3 shows a transport module STM-1 having a virtual container VC-4 and having three virtual containers VC-32.

FIG. 3 shows the known insertion of three virtual containers VC-32 into one virtual container VC-4. A virtual container VC-32 is composed of a 1-byte wide path overhead VC-32 POH and of an 84-byte wide container C-32. After the insertion of the three virtual containers VC-32 into the virtual container VC-4, space remains for three transport unit pointers TU-32 PTR and for fixed stuff bits FS. A container C-2 can accept a 44 736 kbit/s signal.

Figure 4:
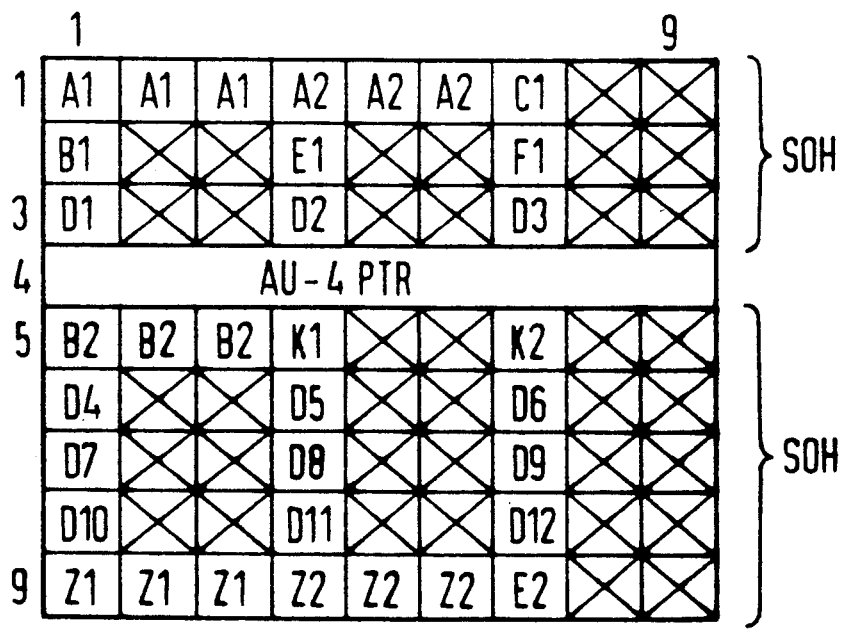
FIG. 4 shows a section overhead for a transport module STM-1.

FIG. 4 shows the section overhead SOH in detail. The bytes provided with letters are defined in the said CCITT Draft Recommendations. The bytes provided with a cross are still freely available.

Figure 5:
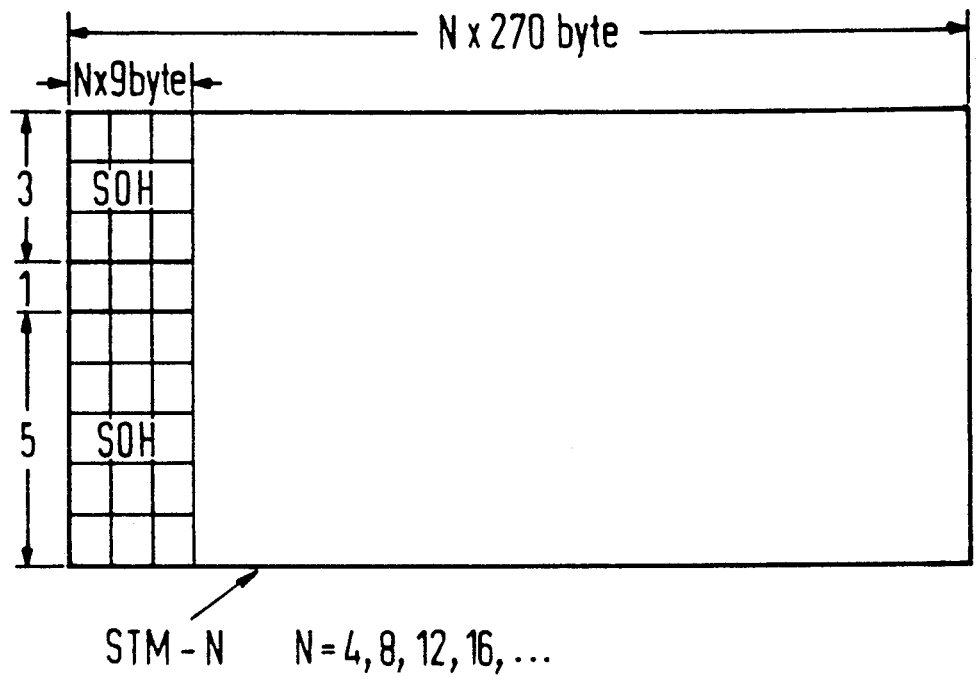
FIG. 5 shows a transport module STM-N.

FIG. 5 shows a known transport module STM-N of a higher order whose column number is N times greater than that of the transport module STM-1. The section overhead, corresponding, has N times as many columns. When N=4 is set, then four transport modules STM-1 can be accommodated in the transport module STM-4.

It is particularly the special subareas SOH, AU-PTR VC-4 POH, VC-31 POH, VC-32, POH, TU-31 PTR, TU-2, PTR and FS that are shown in FIGS. 1 through 5 that can be provided for the inputting and outputting of the invention. One can thereby also limit one self to freely available bytes as indicated by crosses in FIG. 4.

Figure 6:
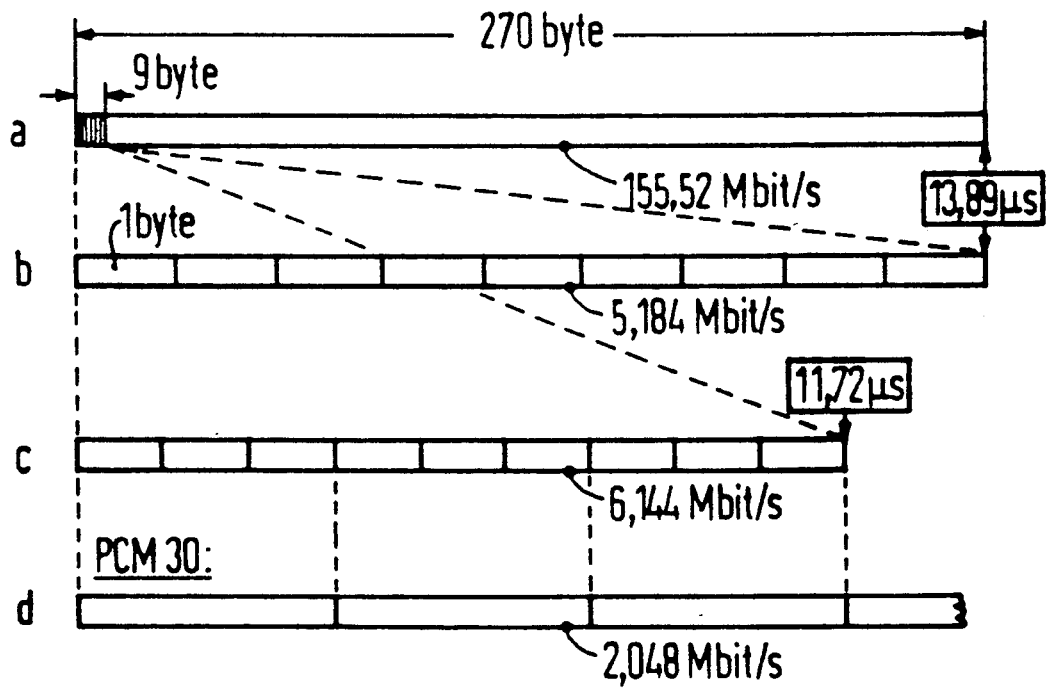
FIG. 6 shows a pulse diagram for explaining the signal spread.

FIG. 6 shows an inventive outputting of the section overhead SOH and of the administration unit point AU-4 PTR of a transport module STM-1. Reference a shows a row of the transport module STM-1 and b shows the 9 bytes spread over the entire row. The processing speed of these bytes is thus reduced by a factor 1/30. The spread onto the complete row length can also be slightly modified, whereby the transmission rate of the plesiochronic basic group of a PCM30 system is advantageously taken into consideration. Reference c shows a corresponding spread and reference d shows three bytes of a PCM30 system for comparison. Taking a PCM24 system into consideration ensues analogously.

The spread factor is slightly lower in both instances since the 9 bytes no longer lay claim to the complete time span of the row. The read clock for the bits of the 9 bytes can thereby be either internally generated in the system by division or can be supplied from the outside.

FIG. 7 shows a modification of the outputting of signals from subareas of a transport module STM-4 with a demultiplexing and spreading means 1A and customer interfaces 2A and 3A.

A transport module STM-4 is supplied to the demultiplexing and spreader means 1A. It then outputs respectively output subarea signals TB-STM-1 of a respective transport module STM-1 contained in the transport module STM-4 onto four lines L1 through L4 synchronized with one another. Control signals T run on the sub-bus SL. The four lines L1 through L4 and the sub-bus SL together form the bus B. After an input of addresses A, the corresponding bytes D can be taken from the bus B via the customer interfaces 2A and 3A.

The modification in FIG. 8 differs from that of FIG. 7 in that the demultiplexing and spreader means IB successively outputs the bytes of the transport modules STM-1 onto 8 lines L5 through L15 bit-parallel.

Other bus structures, for example with data and address bus, are conceivable that are directly matched to microprocessor systems.

Figure 9:
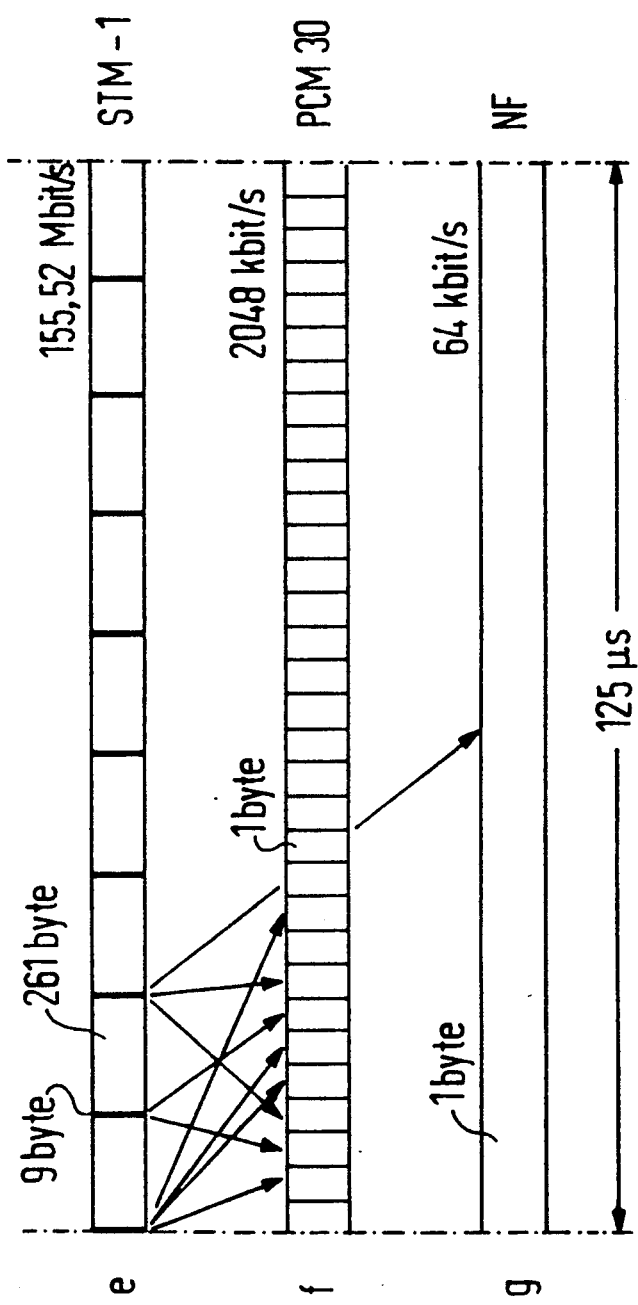
FIG. 9 shows a further-processing of the bus data.

It is set forth with reference to FIG. 9 that individually bytes or arbitrarily grouped groups of bytes can be combined for respective customers in customer-associated units by presetting addresses A. Reference e shows a transport module STM-1 whereof one row has already been shown in FIG. 6 under reference a. Vertical strokes in reference e indicate 9 groups of 9 bytes each. These are selected in a defined way and are inserted reference (f) sorted into the pulse frame of a PCM30 system. However, one byte can be output to a LF channel reference g having a bit rate of 64 kbit/s.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

We claim:

1. Method for outputting signals from at least one subarea of a plurality of subareas of auxiliary signals of transport modules of a synchronous data signal hierarchy conforming to CCITT Draft Recommendations G.70X, G.70Y and G.70Z and for inputting new or modified signals into at least one free or freed up subarea of the plurality of subareas, in accord wherewith a frame of the transport modules is composed of 9 rows and N time 270 columns, N being a whole number, for respectively one byte per row and column and contains an administration unit for the acceptance of virtual containers whose frame start is marked by pointers, comprising the steps of:

for outputting, parting subareas of the plurality of subareas from at least one transport module;

spreading the parted subareas;

combining the spread subareas in series or in parallel on a bus together with control signals, said combined subareas and control signals being representative bytes on the bus;

parting and outputting the bytes or groups of the bytes from the bus as signals; and for inputting, these method steps are implemented in a reverse sequence and in an opposite sense such that bytes or groups of bytes are input as signals to the bus and separated into spread subareas which in turn are compressed and inserted into respective subareas of the plurality of subareas of the transport module.

2. Method according to claim 1 for transport modules of a higher order in the synchronous data signal hierarchy, wherein signals are output from and input to respective subareas of more than one transport module, further comprising the steps of, before the outputting, resolving a transport module of the higher order in the synchronous data signal hierarchy into transport modules of a lower order in the synchronous data signal hierarchy; and, when inputting, combining transport modules of a lower order in the synchronous data signal to form a transport module of the higher order in the synchronous data signal.

3. Method according to claim 2, wherein the bus has a plurality of lines and wherein bytes from a respective transport module of a lower order of the transport modules of the synchronous data signal hierarchy are serially transmitted on a respective line of the plurality of lines of the bus.

4. Method according to claim 3, wherein signals representative of selected bytes of said bytes on the bus are taken from the bus by an interface means having switches for selecting said selected bytes, said interface means being connected to said bus at a predetermined location.

5. Method according to claim 3, wherein signals representative of selected bytes of said bytes on the bus are taken from the bus by an interface means, said interface means being connected to said bus at a predetermined location and being remotely controlled via a control bus connected to said interface means.

6. Method according to claim 2, wherein, when the spread subareas are combined in parallel, output bytes are transmitted bit-parallel on eight lines of the bus.

7. Method according to claim 6, wherein signals representative of selected bytes of said bytes on the bus are taken from the bus by an interface means having switches for selecting said selected bytes, said interface means being connected to said bus at a predetermined location.

8. Method according to claim 6, wherein signals representative of selected bytes of said bytes on the bus are taken from the bus by an interface means, said interface means being connected to said bus at a predetermined location and being remotely controlled via a control bus connected to said interface means.

9. Method according to claim 2, wherein each of the transport modules of the lower order has respective virtual containers with bytes and respective pointers and wherein the bytes from said respective virtual containers are identified for the parting via positions of the respective pointers; and wherein said bytes from said respective virtual containers are introduced during inputting.

10. Method according to claim 1 for transport modules of a higher order in the synchronous data signal, wherein signals are output from and input to respective subareas of more than one transport module, further comprising the steps of: when outputting from subareas that are formed of subareas of a plurality of transport modules, separating these respective subareas after the step of spreading the parted subareas; and, when inputting, combining the respective subareas before the step of compressing the spread subareas.

11. Method according to claim 10, wherein each of the transport modules of the lower order has respective virtual containers with bytes and respective pointers and wherein the bytes from said respective virtual containers are identified for the parting via positions of the respective pointers; and wherein said bytes from said respective virtual containers are introduced during inputting.

12. Method according to claim 10, wherein the bus has a plurality of lines and wherein bytes from a respective transport module of a lower order of the transport modules of the synchronous data signal hierarchy are serially transmitted on a respective line of the plurality of lines of the bus.

13. Method according to claim 12, wherein signals representative of selected bytes of said bytes on the bus are taken from the bus by an interface means having switches for selecting said selected bytes, said interface means being connected to said bus at a predetermined location.

14. Method according to claim 12, wherein signals representative of selected bytes of said bytes on the bus are taken from the bus by an interface means, said interface means being connected to said bus at a predetermined location and being remotely controlled via a control bus connected to said interface means.

15. Method according to claim 10, wherein, when the spread subareas are combined in parallel, output bytes are transmitted bit-parallel on eight lines of the bus.

16. Method according to claim 15, wherein signals representative of selected bytes of said bytes on the bus are taken from the bus by an interface means having switches for selecting said selected bytes, said interface means being connected to said bus at a predetermined location.

17. Method according to claim 15, wherein signals representative of selected bytes of said bytes on the bus are taken from the bus by an interface means, said interface means being connected to said bus at a predetermined location and being remotely controlled via a control bus connected to said interface means.

18. Method according to claim 1, wherein, for outputting, bytes from said virtual containers are identified for the parting via positions of the respective pointers; and wherein, for inputting, bytes are introduced into said virtual containers via positions of the respective pointers.

19. Method according to claim 1, wherein, every subarea of the plurality of subareas of the transport module is composed of at least one complete column of the frame of the transport modules.

20. Method according to claim 1, wherein a bit rate of the signals of the parted subareas that have been spread is selected such that it is a single or a whole-numbered multiple of a bit rate standardized by CCITT.

21. Method according to claim 1, wherein a size of the subareas of the plurality of subareas of the transport module is selected such that a bit rate of the signals of the parted subareas that have been spread is a single or a whole-numbered multiple of a bit rate standardized by CCITT.

22. Method according to claim 1, wherein the at least one transport module has at least one section overhead and wherein the at least one section overhead is one of the plurality of subareas of the at least one transport module.

23. Method according to claim 1, wherein the at least one transport module has at least one path overhead and wherein the at least one path overhead is one of the plurality of subareas of the at least one transport module.

24. Method according to claim 1, wherein the at least one transport module has at least one pointer and wherein the at least one pointer is one of the plurality of subareas of the at least one transport module.

25. Method according to claim 1, wherein areas documented for fixed stuffing are one of the plurality of subareas of the at least one transport module.

26. Method according to claim 1, wherein signals respective of the bytes or groups of the bytes parted from the bus are sorted and are combined to form at least one time-division multiplex signal.

27. Method according to claim 1, wherein only freely available bytes in the frame of the transport modules are utilized in the method.

28. Method according to claim 27, wherein an identifier of the freely available bytes is transmitted on the bus.

29. Method according to claim 1, wherein said control signals are at least one of frame, bit, byte, bytes group, section overhead row and spread bit clocks.

30. Method according to claim 29, wherein externally generated control signals are selected instead of said control signals on the bus, said externally generated control signals being combined with said spread subareas.

* * * * *